United States Patent
Chuang

(10) Patent No.: US 9,688,338 B2
(45) Date of Patent: Jun. 27, 2017

(54) CARBON FIBER RIM, BICYCLE INCLUDING THE SAME AND MANUFACTURE METHOD THEREOF

(71) Applicant: Awise Fiber Technology Co., Ltd, Pingtung (TW)

(72) Inventor: Philip Chuang, Pingtung (TW)

(73) Assignee: Awise Fiber Technology Co., Ltd., Pingtung (TW)

( * ) Notice: Subject to any disclaimer, the term of this patent is extended or adjusted under 35 U.S.C. 154(b) by 336 days.

(21) Appl. No.: 14/103,246

(22) Filed: Dec. 11, 2013

(65) Prior Publication Data

US 2014/0167384 A1    Jun. 19, 2014

(30) Foreign Application Priority Data

Dec. 14, 2012  (TW) .............................. 101224255 U
May 10, 2013  (TW) .............................. 102208722 U

(51) Int. Cl.
| | | |
|---|---|---|
| *B62K 3/02* | (2006.01) | |
| *B60B 21/06* | (2006.01) | |
| *B60B 21/02* | (2006.01) | |
| *B60B 1/00* | (2006.01) | |
| *B60B 5/02* | (2006.01) | |
| *B60B 21/08* | (2006.01) | |
| *B60B 21/04* | (2006.01) | |

(52) U.S. Cl.
CPC ................ *B62K 3/02* (2013.01); *B60B 1/003* (2013.01); *B60B 5/02* (2013.01); *B60B 21/025* (2013.01); *B60B 21/062* (2013.01); *B60B 21/08* (2013.01); *B60B 21/04* (2013.01); *B60B 2310/321* (2013.01); *B60B 2360/3416* (2013.01); *B60B 2900/212* (2013.01); *B60B 2900/321* (2013.01); *B60B 2900/325* (2013.01); *B60Y 2200/13* (2013.01)

(58) Field of Classification Search
CPC ..... B60B 21/025; B60B 21/04; B60B 21/062; B60B 21/08
See application file for complete search history.

(56) References Cited

U.S. PATENT DOCUMENTS 5,975,645 A * 11/1999 Sargent .................. B60B 1/003
    301/55
6,273,836 B1 * 8/2001 Thompson ............... B62M 9/06
    474/160
8,002,362 B2 * 8/2011 Colegrove ............... B60B 5/02
    301/95.103

(Continued)

*Primary Examiner* — Anne Marie Boehler
*Assistant Examiner* — Marlon A Arce
(74) *Attorney, Agent, or Firm* — Muncy, Geissler, Olds & Lowe, P.C.

(57) ABSTRACT

A carbon fiber rim comprises a circular rim and a heat conduction layer. The circular rim comprises carbon fiber composites, and has two opposite side surfaces facing two brake pads and two opposite hooks extending outward radially to hold tires. The heat conduction layer is arranged on the side surface of the circular rim for forming a braking region facing the brake pad. The heat conduction layer comprises a porous or mesh heat conduction material. A bicycle including the aforementioned carbon fiber rim and the manufacturing method of the carbon fiber rim are also disclosed here. The carbon fiber rim can prevent distortion due to frictional heat when braking.

12 Claims, 6 Drawing Sheets

(56) References Cited

U.S. PATENT DOCUMENTS

| | | | | |
|---|---|---|---|---|
| 9,242,421 B2* | 1/2016 | Tsai | ............... | B29C 70/747 |
| 2006/0197369 A1* | 9/2006 | Chiu | ............... | B60B 5/02 |
| | | | | 301/6.3 |
| 2009/0250995 A1* | 10/2009 | Tsai | ............... | B60B 5/02 |
| | | | | 301/95.102 |
| 2011/0233005 A1* | 9/2011 | Lee | ............... | B60T 1/06 |
| | | | | 188/24.13 |
| 2012/0025597 A1* | 2/2012 | Koshiyama | ............... | B60B 1/003 |
| | | | | 301/95.102 |
| 2012/0056468 A1* | 3/2012 | Tsai | ............... | B60B 5/02 |
| | | | | 301/95.103 |
| 2012/0292980 A1* | 11/2012 | Lee | ............... | B60B 5/02 |
| | | | | 301/95.102 |
| 2014/0015307 A1* | 1/2014 | Poertner | ............... | B60B 21/08 |
| | | | | 301/6.9 |
| 2014/0167492 A1* | 6/2014 | Tho | ............... | B60B 21/025 |
| | | | | 301/95.102 |

* cited by examiner

CARBON FIBER RIM, BICYCLE INCLUDING THE SAME AND MANUFACTURE METHOD THEREOF

BACKGROUND OF THE INVENTION

1. Field of the Invention

The present invention is directed to a carbon fiber rim, a bicycle including the same and a manufacture method thereof, and more particularly to a carbon fiber rim enhancing heat-dissipation, a bicycle including this type of carbon fiber rim and a manufacture method thereof.

2. Description of the Prior Art

Conventionally, a carbon fiber rim has hooks extending outward along the radial direction to couple the rim and a tire together. Generally, a brake pad is used to clamp the outside of the rim to create friction to decelerate the bicycle. However, the position of the rim where the brake pad contacts is near the hook. High temperature caused by frictional heat and tire pressure may lead to distortion of the hook so as to affect safety. Therefore, it is necessary to develop a solution to prevent distortion of the carbon fiber rim caused by frictional heat when braking.

SUMMARY OF THE INVENTION

The present invention is directed to a carbon fiber rim, a bicycle using including the same and a manufacture method thereof. A heat conduction layer is arranged on the region where the brake pads contact the circular rim to disperse frictional heat when braking, and then the frictional heat being conducted to the circular rim is decreased. Therefore, the carbon fiber rim of the present invention can prevent distortion of the carbon fiber rim when braking.

In one embodiment of the present invention, the carbon fiber rim applied to a bicycle comprises a circular rim and two heat conduction layers. The circular rim comprises carbon fiber composites, and the circular rim has two opposite side surfaces facing two brake pads of the bicycle and two opposite hooks extending outward radially to hold a tire of the bicycle. The two heat conduction layers are respectively arranged on the two side surfaces for forming two braking regions facing the brake pads of the bicycle. Each of the heat conduction layers comprises a metal grid and meshes of the metal grid are filled with resin of the carbon fiber composites.

In another embodiment of the present invention, the bicycle comprises a bicycle frame, a front wheel, a rear wheel, a steering component and a transmission component. The front wheel and the rear wheel are respectively arranged on a front end and on a rear end of the bicycle frame. At least one of the front wheel and the rear wheel comprises a carbon fiber rim which comprises a circular rim and two heat conduction layers. The circular rim comprises carbon fiber composites, and the circular rim has two opposite side surfaces facing two brake pads of the bicycle and two opposite hooks extending outward radially to hold a tire of the bicycle. The two heat conduction layers are respectively arranged on the two side surfaces for forming two braking regions facing the brake pads of the bicycle. Each of the heat conduction layers comprises a metal grid and meshes of the metal grid are filled with resin of the carbon fiber composites. The steering component is connected to the front wheel for controlling moving direction of the front wheel. The transmission component is connected to the rear wheel for transmitting pedal power caused by a user to drive the rear wheel.

In another embodiment of the present invention, the manufacturing method of a carbon fiber rim comprises several steps. The first one is forming an outline of a circular rim with a plurality of carbon fiber composites. The circular rim comprises two opposite side surfaces facing two brake pads, and comprises two opposite hooks extending outward radially to hold tires. The second one is thermally molding the circular rim and a heat conduction layer. The heat conduction layer is arranged on the side surface for forming a braking region facing the brake pad. The heat conduction layer comprises a porous or mesh heat conduction material.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
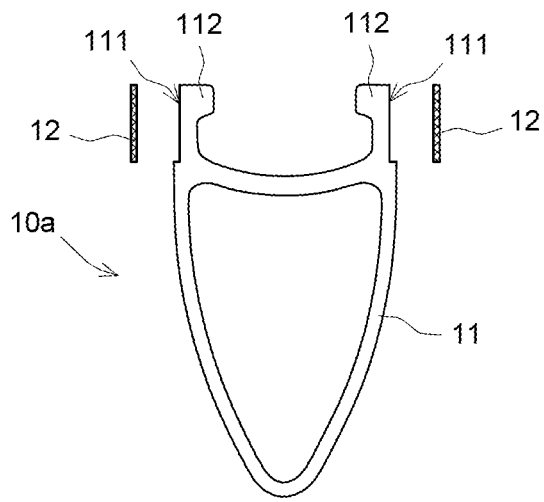
FIG. 1 is a section view illustrating the disassembling structure of the carbon fiber rim according to the first embodiment of the present invention.
Figure 2:
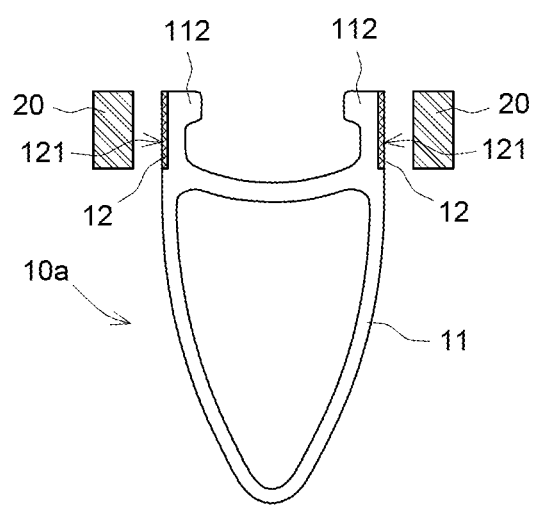
FIG. 2 is a section view illustrating the assembling structure of the carbon fiber rim according to the first embodiment of the present invention.

According to an embodiment of the present invention and referring to FIG. 1 and FIG. 2, the carbon fiber rim 10a comprises a circular rim 11 and two heat conduction layers 12. The circular rim 11 comprises carbon fiber composites. Besides, the circular rim 11 comprises two opposite side surfaces 111 facing two brake pads 20, and comprises two opposite hooks 112 extending outward radially to hold tires. Two heat conduction layers 12 are arranged on the side surfaces 111 of the circular rim 11 for forming two opposite braking regions 121 facing the brake pads 20. The heat conduction layers 12 comprise a heat conduction material. In one embodiment, the heat conduction layer 12 can be porous or has mesh structure. For example, the heat conduction materials comprise a metal grid. In one embodiment, the thickness of the metal grid is between 0.01 mm to 1 mm. Preferably, the thickness of the metal grid is between 0.01 mm to 0.3 mm, or between 0.05 mm to 0.5 mm. According to the structure described above, the heat conduction layers 12 conduct and disperse frictional heat when braking and then dissipating heat out.

It should be noticed that although the carbon fiber rim 10a shown in FIG. 2 comprises two heat conduction layers 12, it is not limited to this. In one embodiment, the heat conduction layer 12 arranged on any one of the heat conduction layers 12 can achieve the effect of heat dissipation to reduce accumulated frictional heat so as to lower the temperature of the carbon fiber rim.

Figure 3:
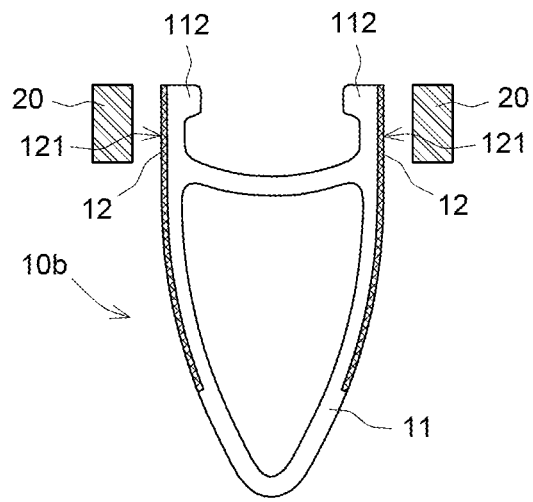
FIG. 3 is a section view illustrating the carbon fiber rim according to the second embodiment of the present invention.
Figure 4:
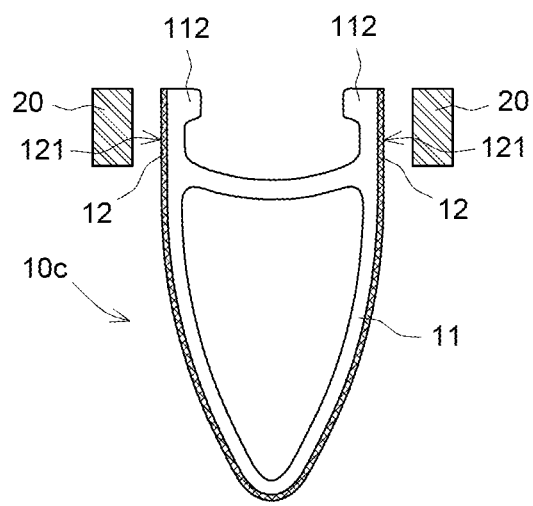
FIG. 4 is a section view illustrating the carbon fiber rim according to the third embodiment of the present invention.

In the embodiment shown in FIG. 2, the heat conduction layer 12 is only arranged on the braking region 121 facing to the brake pad 20 but not limited to this. Referring to FIG. 3 and FIG. 4, in one embodiment, the position of the heat conduction layer 12 of the carbon fiber rim 10b and 10c can extend inwards radially along the braking region 121 to cover larger outside surface of the circular rim 11 (as the carbon fiber rim 10b shown in FIG. 3), or wholly cover the outside surface of the circular rim 11 (as the carbon fiber rim 10c shown in FIG. 4). Accordingly, these carbon fiber rims 10b and 10c of the present invention achieve better effect of heat dissipation.

Figure 5:
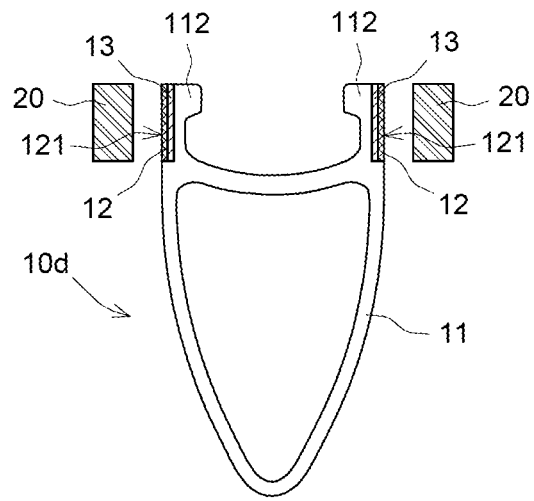
FIG. 5 is a section view illustrating the carbon fiber rim according to the fourth embodiment of the present invention.

Referring to FIG. 5, difference between the carbon fiber rim 10d in FIG. 5 and the carbon fiber rim 10a in FIG. 2 lies in a heat insulation layer 13. In FIG. 5, the carbon fiber rim 10d further comprises a heat insulation layer 13 which is arranged between the side surface 111 and the heat conduction layer 12. The heat insulation layer 13 comprises a heat insulation material. In one embodiment, the heat insulation material may be inorganic fiber composites. For example, the heat insulation materials comprise resin (e.g. epoxy) and at least one of glass fibers, ceramic fibers and asbestos fibers. In one embodiment, the heat insulation materials are prepregs made of fiber materials mentioned before. The heat insulation layer 13 arranged between the heat conduction layer 12 and the circular rim 11 prevents frictional heat being conducted to the circular rim 11 so as to prevent distortion of the carbon fiber rim 10 when braking.

Figure 7:
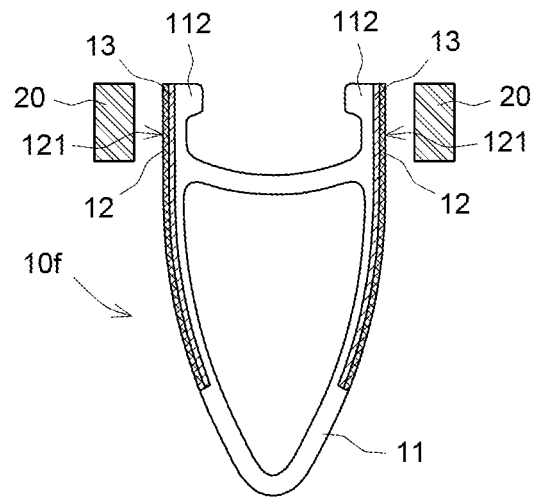
FIG. 7 is a section view illustrating the carbon fiber rim according to the sixth embodiment of the present invention.
Figure 8:
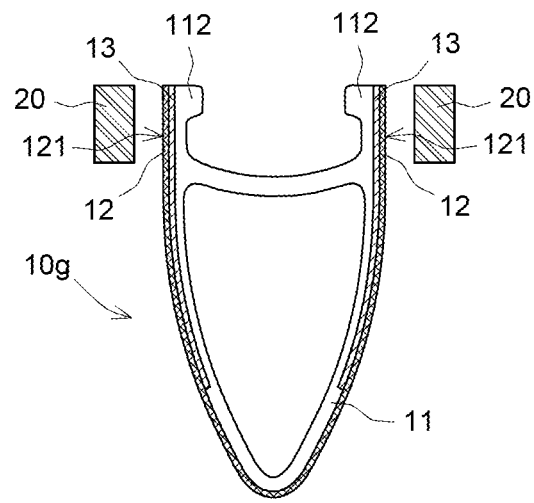
FIG. 8 is a section view illustrating the carbon fiber rim according to the seventh embodiment of the present invention.

Similarly, the heat insulation layer 13 also can be applied to the embodiments shown in FIG. 3 and FIG. 4, as the carbon fiber rim 10f and 10g shown in FIG. 7 and FIG. 8. Comparing to the embodiment shown in FIG. 5, it should be noticed that the coverage area of the heat insulation layer 13 can increase along with the heat conduction layer 12 as shown in FIG. 7. Whereas, temperature of the position far from the braking region 121 may decrease and does not cause deformation to the circular rim 11. Hence, the coverage area of the heat insulation layer 13 can be smaller than that of the heat insulation layer 12, as shown in FIG. 8.

Figure 6:
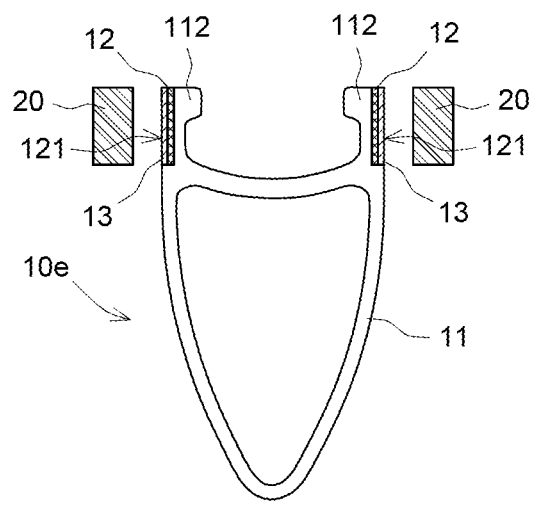
FIG. 6 is a section view illustrating the carbon fiber rim according to the fifth embodiment of the present invention.

Referring to FIG. 6, in one embodiment, the heat insulation layer 13 can be arranged on the outside surface of the heat conduction layer 12 and face the brake pad 20, as the carbon fiber rim 10e shown in FIG. 6. The heat insulation layer 13 described here can reduce heat transmitted to the circular rim 11 when braking; heat transmitted to the inside surface of the heat conduction layer 12 can be dispersed thereby. Accordingly, the carbon fiber rim 10e shown in the FIG. 6 achieves better effect of heat dissipation comparing to the carbon fiber rim 10a shown in FIG. 2.

Figure 9:
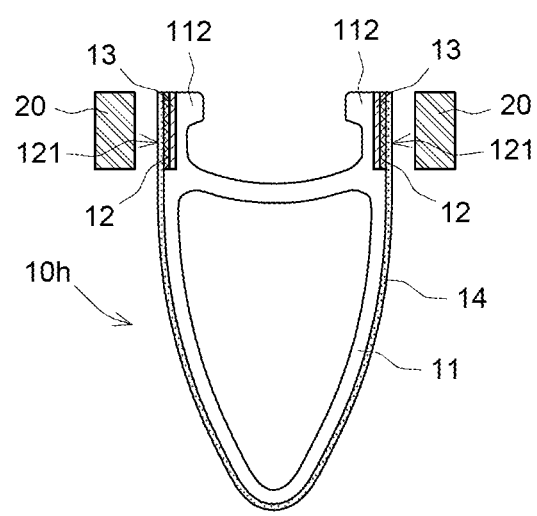
FIG. 9 is a section view illustrating the carbon fiber rim according to the eighth embodiment of the present invention.

Referring to FIG. 9, the difference between the carbon fiber rim 10h shown in FIG. 9 and the carbon fiber rim 10d shown in FIG. 5 lies in a protective layer 14. The carbon fiber rim 10h shown in FIG. 9 further comprises a protective layer 14 which is arranged on the outside surface of the carbon fiber rim 10h. It not only protects the circular rim 11 and the heat conduction layer 12 but decorates the carbon fiber rim 10h. It should be noticed the protective layer 14 can be also applied to the embodiments mentioned before.

Referring to FIG. 1 and FIG. 2, a manufacturing method of the carbon fiber rim 10a according to the present invention is disclosed here. The first step is forming an outline of a circular rim 11 with a plurality of carbon fiber composites. The circular rim 11 comprises two opposite side surfaces 111 facing two brake pads 20, and comprises two opposite hooks 112 extending outward radially to hold tires. The second one is thermally molding the circular rim 11 and two heat conduction layers 12. The heat conduction layers 12 are arranged on the two side surfaces 111 for forming two opposite braking regions 121 facing the brake pads 20. The heat conduction layer 12 comprises a heat conduction material.

In one embodiment, the heat conduction material can be porous or has mesh structure. For example, it is a metal grid. When thermally molding, resin in the carbon fiber composites of the circular rim 11 is melting with fluidity when heating. Thus, meshes of the metal grid are filled with fluid resin to combine the circular rim 11 and the heat conduction layers 12 together. According to the manufacturing method described above, it not only simplifies the manufacturing process but also obtain greater combination strength of the circular rim 11 and the heat conduction layers 12. Similarly, the heat insulation layer 13 can be integrated together by thermally molding. Resin in the carbon fiber composites of the inorganic fiber composites of the heat insulation layer 13 is melting with fluidity when heating. Thus, meshes of the metal grid are filled with fluid resin to combine the circular rim 11, the heat conduction layers 12 and the heat insulation layer 13 together.

In one embodiment, the manufacturing method of the carbon fiber rim according to the present invention further comprises forming a protective layer on the outside, surface of the carbon fiber rim. The step of forming the protective layer can be accomplished by conventional processes. For example, the protective layer can be simultaneously formed when thermal molding or formed on the outside surface of the carbon fiber rim after the carbon fiber rim is formed by thermal molding.

Figure 10:
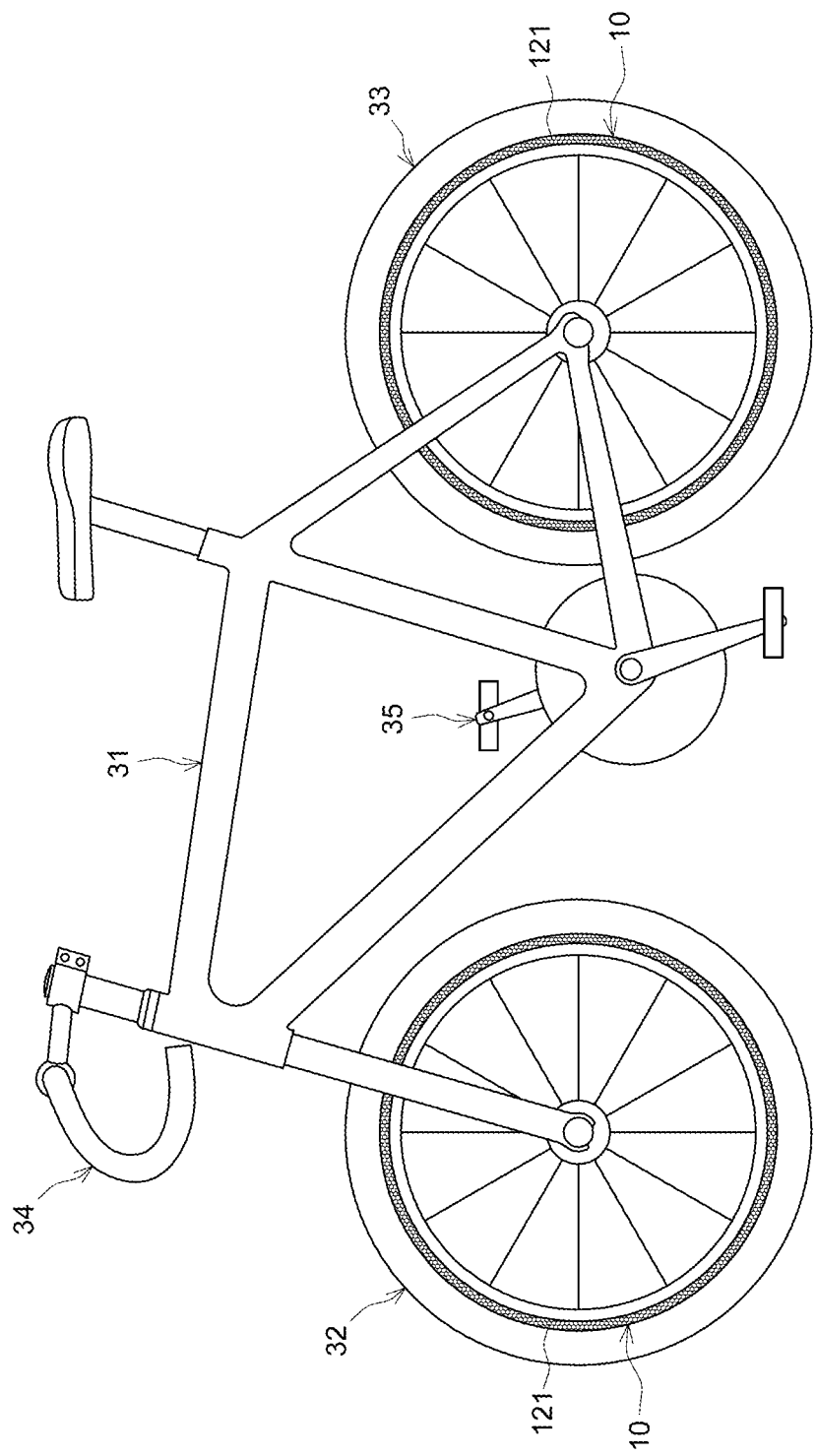
FIG. 10 is a schematic diagram illustrating the bicycle according to an embodiment of the present invention.

Referring to FIG. 10 and according to one embodiment of the present invention, the bicycle comprises a bicycle frame 31, a front wheel 32, a rear wheel 33, a steering component 34 and a transmission component 35. The bicycle frame 31 can be a metal frame or a carbon fiber frame, which can use existing designs or modification thereof and it will not be elaborated herein. The front wheel 32 and the rear wheel 33 are respectively arranged on the front side and on the rear side of the bicycle frame 31. At least one of the front wheel 32 and the rear wheel 33 comprises one of the carbon fiber rims 10a~10h described before. Structure of the carbon fiber rims 10a~10h is described in detail before and will not be elaborated herein. The steering component 34 is connected to the front wheel 32 for controlling moving direction of the front wheel 32. For example, the steering component 34 comprises a handlebar grip, front fork etc. The transmission component 35 is connected to the rear wheel 33 for transmitting pedal power caused by a user to drive the rear wheel 33. For example, the transmission component 35 comprises cranks, pedals, chains, gears etc. By pedaling, the rear wheel 33 can be rotated so as to drive the bicycle to move forward.

In conclusion, a conduction layer is arranged on the region where the brake pads contact the rim to disperse frictional heat when braking. Besides, a heat insulation layer can be arranged to prevent frictional heat being conducted to the circular rim so as to prevent distortion of the carbon fiber rim.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A carbon fiber rim applied to a bicycle, comprising:
   a circular rim which comprises carbon fiber composites, wherein the circular rim comprises two opposite side surfaces facing two brake pads of the bicycle, and the circular rim comprises two opposite hooks extending outward radially to hold a tire of the bicycle; and
   two heat conduction layers respectively arranged on the two side surfaces for forming two braking regions facing the brake pads of the bicycle, wherein each of the heat conduction layers comprises a metal grid and meshes of the metal grid are filled with resin of the carbon fiber composites.

2. The carbon fiber rim according to claim 1, wherein each of the heat conduction layers extends inwards radially along an outside surface of the circular rim or covers an outside surface of the circular rim.

3. The carbon fiber rim according to claim 1, further comprising:
   a heat insulation layer arranged on an outside surface of each of the heat conduction layers and facing the brake pad of the bicycle, or arranged between one of the side surface of the circular rim and the heat conduction layer, wherein the heat insulation layer comprises a heat insulation material.

4. The carbon fiber rim according to claim 3, wherein the heat insulation material comprises inorganic fiber composites.

5. The carbon fiber rim according to claim 1, further comprising:
   a protective layer arranged on an outside surface of the carbon fiber rim.

6. The carbon fiber rim according to claim 1, wherein a thickness of the metal grid is between 0.01 mm and 1 mm.

7. A bicycle, comprising:
   a bicycle frame;
   a front wheel arranged on a front end of the bicycle frame;
   a rear wheel arranged on a rear end of the bicycle frame, wherein at least one of the front wheel and the rear wheel comprises a carbon fiber rim, and the carbon fiber rim comprises:
      a circular rim, which comprises carbon fiber composites, wherein the circular rim comprises two opposite side surfaces facing two brake pads of the bicycle, and the circular rim comprises two opposite hooks extending outward radially to hold a tire of the bicycle; and
      two heat conduction layers respectively arranged on the two side surfaces for forming two braking regions facing the brake pads of the bicycle, wherein each of the heat conduction layers comprises a metal grid and meshes of the metal grid are filled with resin of the carbon fiber composites; and
   a steering component connected to the front wheel for controlling moving direction of the front wheel; and
   a transmission component connected to the rear wheel for transmitting pedal power caused by a user to drive the rear wheel.

8. The bicycle according to claim 7, wherein each of the heat conduction layers extends inwards radially along an outside surface of the circular rim or covers an outside surface of the circular rim.

9. The bicycle according to claim 7, wherein the carbon fiber rim further comprises:
   a heat insulation layer arranged on an outside surface of each of the heat conduction layers and facing the brake pad of the bicycle, or arranged between one of the side surface of the circular rim and the heat conduction layer, wherein the heat insulation layer comprises a heat insulation material.

10. The bicycle according to claim 9, wherein the heat insulation material comprises inorganic fiber composites.

11. The bicycle according to claim 7, wherein the carbon fiber rim further comprises a protective layer arranged on an outside surface of the carbon fiber rim.

12. The bicycle according to claim 7, wherein a thickness of the metal grid is between 0.01 mm and 1 mm.

* * * * *